(12) United States Patent  
Yamada

(10) Patent No.: US 8,929,200 B2  
(45) Date of Patent: Jan. 6, 2015

(54) COMMUNICATION DEVICE, COMMUNICATION SYSTEM, AND COMMUNICATION METHOD

(71) Applicant: Fujitsu Limited, Kawasaki-shi, Kanagawa (JP)

(72) Inventor: Hirotaka Yamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 93 days.

(21) Appl. No.: 13/770,084

(22) Filed: Feb. 19, 2013

(65) Prior Publication Data

US 2013/0259059 A1 Oct. 3, 2013

(30) Foreign Application Priority Data

Mar. 30, 2012 (JP) .................................. 2012-080324

(51) Int. Cl.
*H04L 12/24* (2006.01)
*H04L 12/833* (2013.01)
*H04L 12/823* (2013.01)
*H04L 12/26* (2006.01)
*H04L 12/46* (2006.01)
*H04L 12/931* (2013.01)
*H04L 12/939* (2013.01)

(52) U.S. Cl.
CPC ............. *H04L 41/24* (2013.01); *H04L 43/0811* (2013.01); *H04L 12/4625* (2013.01); *H04L 49/351* (2013.01); *H04L 49/555* (2013.01)
USPC .......................................... 370/216; 370/243

(58) Field of Classification Search
CPC ...... H04N 5/145; H04N 7/0132; H04N 7/014; H04W 28/20; H04W 72/082; H04L 41/06; H04L 41/0681; H04L 47/31; H04L 47/32
USPC .......................... 370/254–350; 709/201–213
See application file for complete search history.

(56) References Cited

U.S. PATENT DOCUMENTS 7,835,376 B2 * 11/2010 Tanaka .......................... 370/401
8,018,864 B2 *  9/2011 Tomiyasu et al. ............. 370/252
2009/0010254 A1  1/2009 Shimada

FOREIGN PATENT DOCUMENTS

| JP | 2007-243466 | 9/2007 |
|----|-------------|--------|
| JP | 2009-17032  | 1/2009 |
| JP | 2010-154128 | 7/2010 |

* cited by examiner

Primary Examiner — Ayaz Sheikh
Assistant Examiner — Debebe Asefa
(74) Attorney, Agent, or Firm — Staas & Halsey LLP

(57) ABSTRACT

A communication device includes: a plurality of ports configured to transmit and receive frames to and from another device; a switching unit configured to transfer the frames to another port based on identification information of the frames; a plurality of reception processing units configured to individually receive the frames transferred from the switching unit; a duplication processing unit configured to duplicate the frames, individually assign the identification information indicating a corresponding port to a plurality of duplicated frames and output the plurality of duplicated frames to the switching unit; and a control unit configured to perform control in accordance with control information included in one duplicated frame of the plurality of duplicated frames.

13 Claims, 15 Drawing Sheets

FIG. 10

| HEADER | | | OAM DATA | | FCS |
|---|---|---|---|---|---|
| DA | SA | TYPE | OAM FRAME TYPE | OTHER | |

FIG. 11

| CONTROL FRAME TYPE | CONTENT |
|---|---|
| CCM (CONTINUITY CHECK MESSAGE) | FRAME FOR CONNECTIVITY TEST |
| LBM (LOOPBACK MESSAGE) | FRAME FOR LOOPBACK TEST |
| LBR (LOOPBACK REPLY) | RESPONSE FRAME CORRESPONDING TO LBM |
| LTM (LINK TRANCE MESSAGE) | FRAME FOR LINK TRACE |
| LTR (LINK TRANCE REPLY) | RESPONSE FRAME CORRESPONDING TO LTR |
| AIS (ALARM INDICATION SIGNAL) | UPLINK-SIDE ALARM NOTIFICATION FRAME |

FIG. 12

| GROUP | PORT | LINK STATE |
|---|---|---|
| #1 | #1 | NORMAL |
| | #5 | ABNORMAL |
| | #10 | NORMAL |
| #2 | #3 | NORMAL |
| | #6 | NORMAL |
| | #12 | NORMAL |

FIG. 13

| LA | PORT |
|---|---|
| #1 | #1 |
|  | #5 |
|  | #10 |
| #2 | #3 |
|  | #6 |
|  | #12 |

COMMUNICATION DEVICE, COMMUNICATION SYSTEM, AND COMMUNICATION METHOD

CROSS-REFERENCE TO RELATED APPLICATION(S)

This application is based upon and claims the benefit of priority of the prior Japanese Patent Application No. 2012-80324, filed on Mar. 30, 2012, the entire contents of which are incorporated herein by reference.

FIELD

The embodiments discussed herein are related to a communication device, a communication system, and a communication method.

BACKGROUND

In link aggregation, communication lines provided in each communication port and bundled together are handled as an integrated single communication line. As a standard specification, the link aggregation is specified in IEEE802.3ad (IEEE: The Institute of Electrical and Electronics Engineers, Inc.).

While the link aggregation has features such as a wider bandwidth of communication and redundancy, since a plurality of physical communication lines are integrated and managed, an operation and maintenance function (Operation Administration and Maintenance: OAM) is complicated. The OAM function in a network of an Ethernet (registered trademark, the same shall apply hereinafter) is specified in ITU-T Recommendation G.8013/Y.1731 (ITU-T: International Telecommunication Union Telecommunication Standardization Sector), as a standard specification.

Related techniques are disclosed in Japanese Laid-open Patent Publication No. 2009-17032, Japanese Laid-open Patent Publication No. 2010-154128, Japanese Laid-open Patent Publication No. 2007-243466, and the like.

SUMMARY

According to one aspect of the embodiments, a communication device includes: a plurality of ports configured to transmit and receive frames to and from another device; a switching unit configured to transfer the frames to another port based on identification information of the frames; a plurality of reception processing units configured to individually receive the frames transferred from the switching unit; a duplication processing unit configured to duplicate the frames, individually assign the identification information indicating a corresponding port to a plurality of duplicated frames and output the plurality of duplicated frames to the switching unit; and a control unit configured to perform control in accordance with control information included in one duplicated frame of the plurality of duplicated frames.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an exemplary OAM frame;
FIG. 11 illustrates an exemplary OAM frame type;
FIG. 12 illustrates an exemplary LA state table;
FIG. 13 illustrates an exemplary LA setting table.

DESCRIPTION OF EMBODIMENTS

When a management end point (Maintenance entity group End Point: MEP) of an OAM function is provided so as to correspond to each communication port belonging to link aggregation, failure detection within a device, which relates to the link states of individual communication lines, and failure detection between devices, based on an OAM frame, may be performed in parallel in a communication device.

Figure 1:
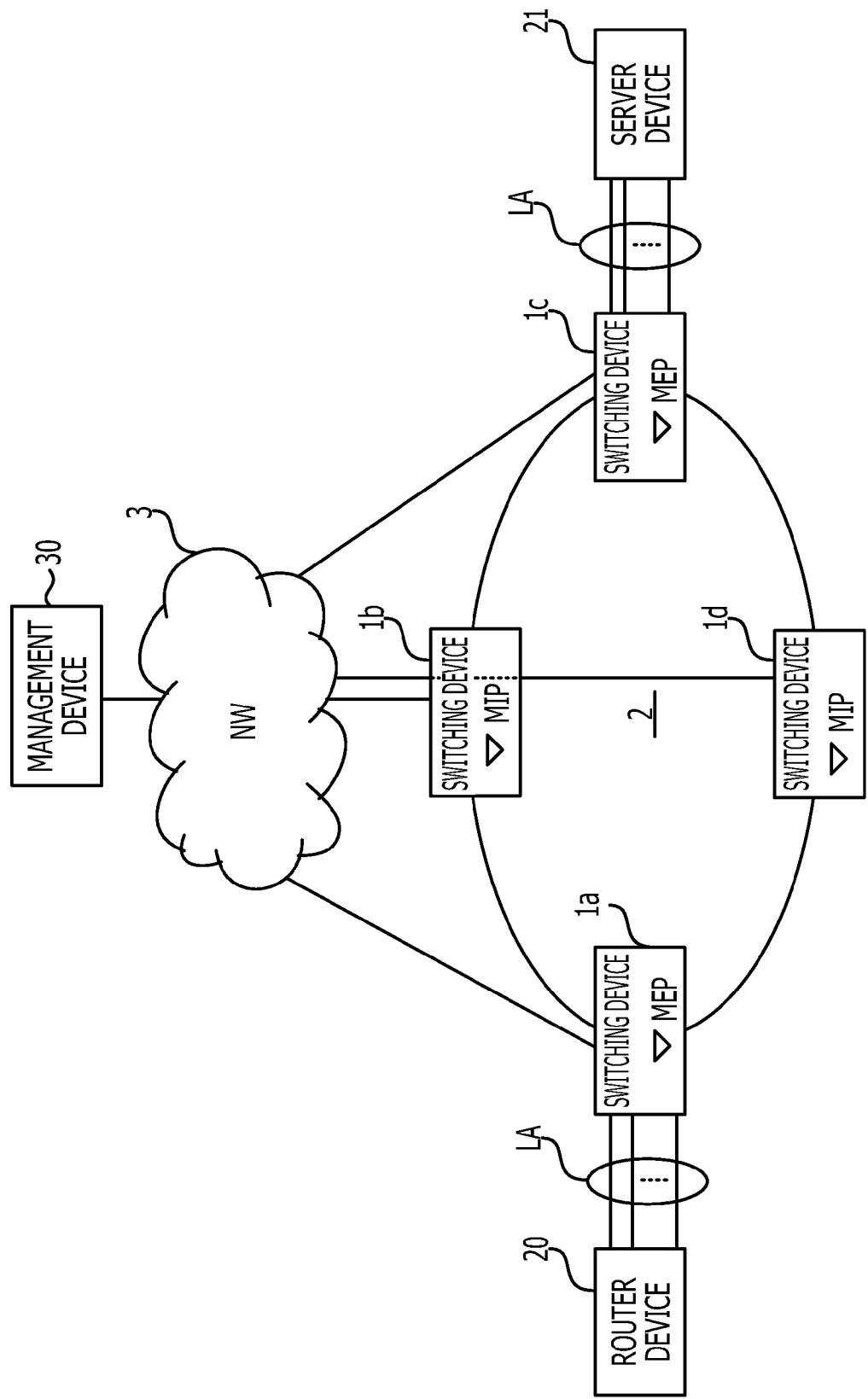
FIG. 1 illustrates an exemplary network.

FIG. 1 illustrates an exemplary network. A network 2 may be, for example, a Local Area Network (LAN), and includes a plurality of switching devices 1a to 1d, a router device 20, and a server device 21.

The plural switching devices 1a to 1d may be referred to as Layer 2 switches. The plural switching devices 1a to 1d may be also communication devices relaying frames of an Ethernet (registered trademark), and are coupled to one another so as to make a ring type form. The router device 20 is coupled to the switching device 1a, and relays frames transmitted and received to and from an external network such as, for example, Internet. The server device 21 is coupled to the switching device 1c, and provides a predetermined service to a terminal device located inside or outside the network 2. The plural switching devices 1a to 1d are not limited to the ring type, and may be coupled to one another so as to make another form such as a mesh type.

The plural switching devices 1a to 1d, the router device 20, and the server device 21 are connected to one another, and may perform communication compliant with a standard specification such as, for example, 100BASE-Tx or 1000BASE-T. Since the router device 20 and the switching device 1a and the server device 21 and the switching device 1c have transmission and reception amounts larger than another portion in the network 2, the router device 20 and the server device 21 are coupled to the switching device 1a and the switching device 1c, respectively, by link aggregation LA, so as to improve the throughput of the whole network 2.

In the link aggregation LA, since a plurality of physical communication lines are integrated and handled as a virtual single communication line, a communication capacity increases and the communication lines become redundant. For example, when the link aggregation LA where 6 physical communication lines of 1000BASE-T are integrated is used between the router device 20 and the switching device 1a, frames may be transmitted and received with a communication speed of 6 (Gbps).

The plural switching devices 1a to 1d are coupled to a management device 30 through a management network 3. The management device 30 may be referred to as a Network Operation System (NE-OpS). The management device 30 may be, for example, a server device into which software for monitoring and controlling the plural switching devices 1a to 1d is installed. In accordance with an operation of an administrator, the management device 30 may set, in the plural switching devices 1a to 1d, an MEP serving as the management end point of an Ethernet OAM function or a Maintenance entity group Intermediate Point (MIP) serving as a management relay point. For example, in FIG. 1, the link aggregation LA is applied between the router device 20 and the switching device 1a, and the MEP is set in the switching device 1a. The link aggregation LA is applied between the server device 21 and the switching device 1c, and the MEP is set in the switching device 1c. The MIPs are set in the other switching devices 1b and 1d.

Figure 2:
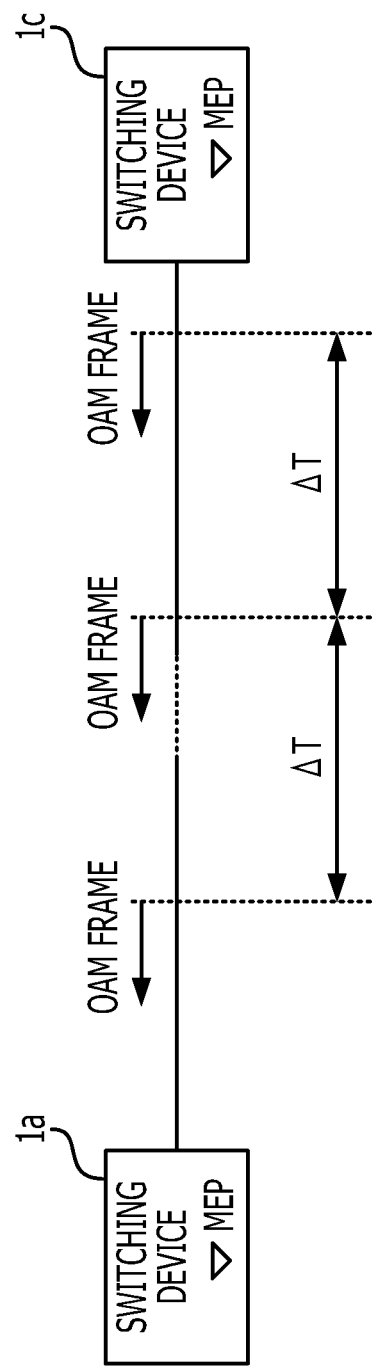
FIG. 2 illustrates an exemplary connectivity test.

Between the switching device 1a and the switching device 1c, in which the MEPs are provided, the management device 30 executes monitoring or control, which includes various kinds of tests. FIG. 2 illustrates an exemplary connectivity test. In the connectivity test (Continuity Check (CC)) illustrated in FIG. 2, with a given period, for example, a given time interval ΔT, the one switching device 1c transmits an OAM frame including control information from the MEP of the self-device to the MEP of the other switching device 1a. The value of the period may be included in the OAM frame, as control information.

When the MEP of the switching device 1a on a receiving side does not receive the OAM frame within a time greater than or equal to three and a half times longer the period, a failure of a connectivity error may be detected. For example, in the test, which of the switching devices 1b and 1d the OAM frame goes through may be determined based on a setting from the management device 30.

Figure 3:
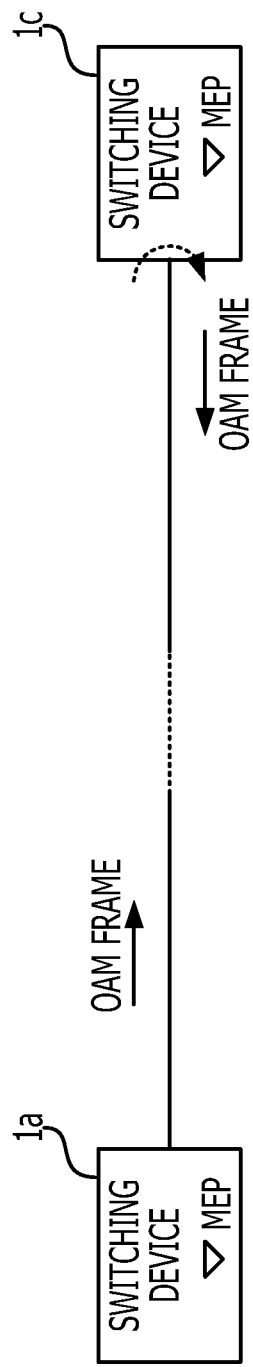
FIG. 3 illustrates an exemplary loopback test.

FIG. 3 illustrates an exemplary loopback test. In the loopback test (Loop Back (LB)) illustrated in FIG. 3, the one switching device 1a transmits an OAM frame including control information from the MEP of the self-device to the MEP of the other switching device 1c. When the MEP of the switching device 1c on a receiving side has received the OAM frame, the switching device 1c transmits, in a loop-back manner, an OAM frame (response frame) to the MEP of the switching device 1a serving as a transmission source (refer to an arrow of a dotted line). When not having received the OAM frame from the MEP of the switching device 1c on the receiving side within a predetermined time from the transmission time of the OAM frame, the MEP of the switching device 1a serving as a transmission source may detect a failure of a connection error.

Figure 4:
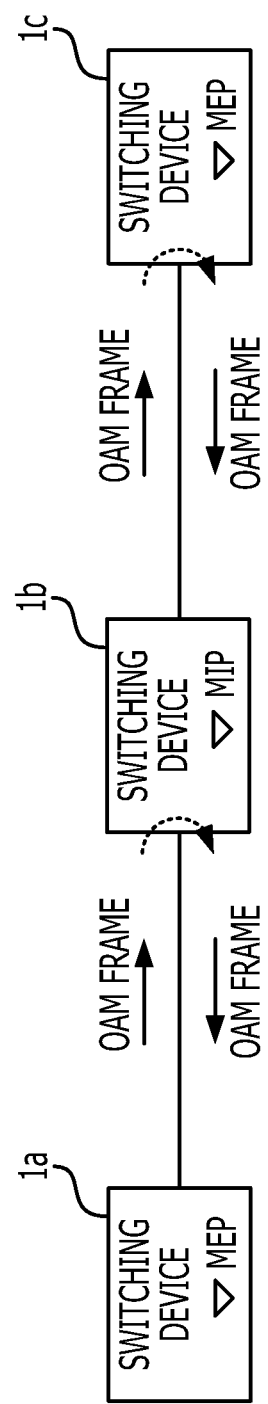
FIG. 4 illustrates an exemplary link trace.

FIG. 4 illustrates an exemplary link trace. In the link trace (Link Trace (LT)) illustrated in FIG. 4, a path within the network 2 may be inspected. For example, an OAM frame including control information is transmitted from the MEP of the one switching device 1a to the MIP of the switching device 1b serving as an adjacent node. For example, the control information may include a parameter such as Time To Live (TTL).

In the switching device 1b, the MIP having received the OAM frame transmits an OAM frame (response frame) serving as a response, to the switching device 1a serving as the transmission source, and transfers the OAM frame to the MEP of the switching device 1c serving as an adjacent node. When having received the OAM frame, the MEP of the switching device 1c transmits an OAM frame (response frame) serving as a response, to the switching device 1a serving as the transmission source through the switching device 1b without performing subsequent transfer. Since the TTL is decremented by one with respect to each of the switching devices 1b and 1c and included in the response frame, the form of the network 2 is detected by the execution of the link trace.

Figure 5:
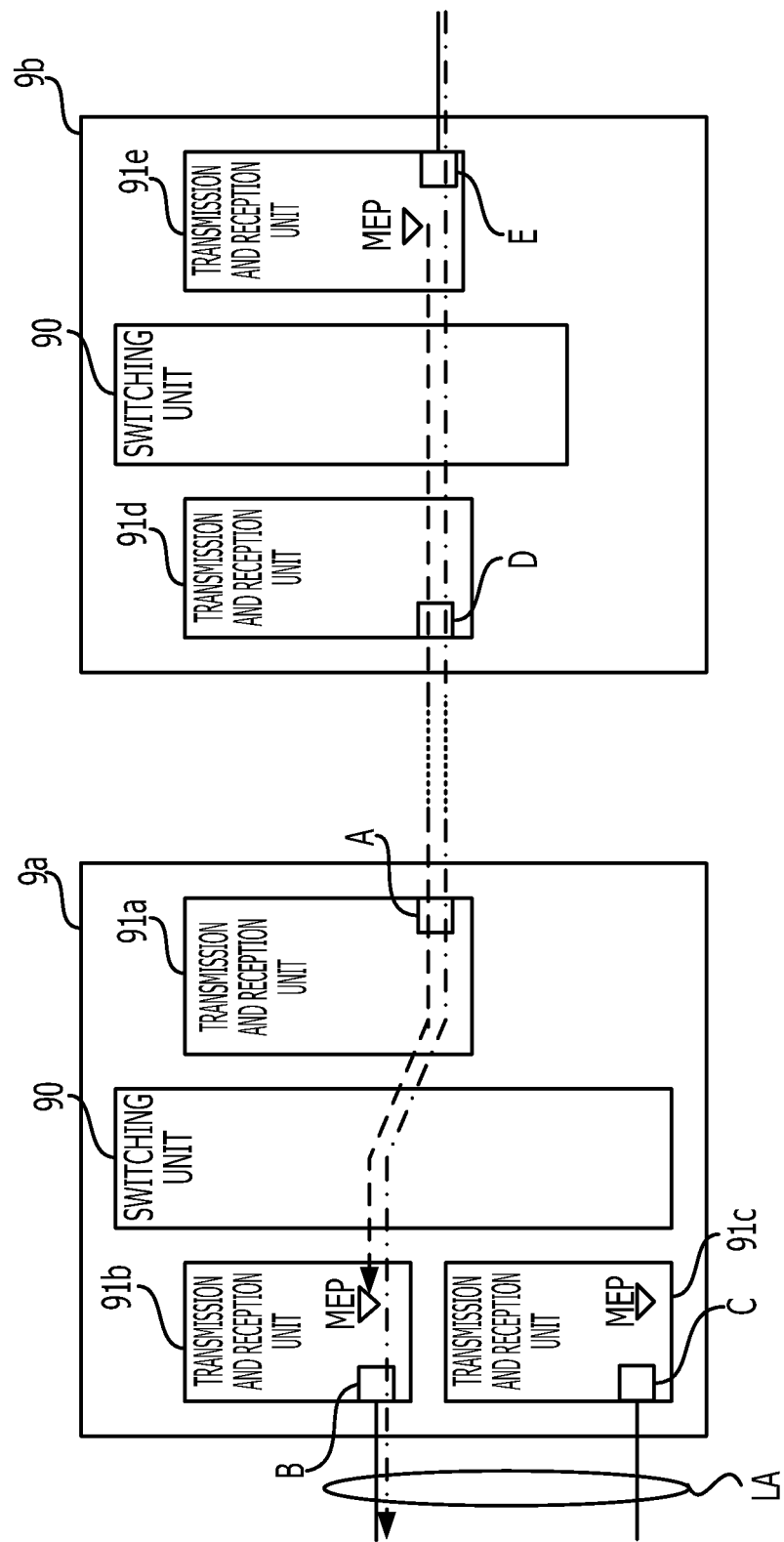
FIG. 5 illustrates an exemplary transmission path of a frame.

FIG. 5 illustrates an exemplary transmission path of a frame. In FIG. 5, the transmission paths of a user frame and an OAM frame between switching devices may be illustrated. A dotted line in FIG. 5 (in the following FIG. 6 to FIG. 9) indicates the path of an OAM frame between the MEPs of the individual switching devices 9a and 9b. A dashed-dotted line in FIG. 5 (in the following FIG. 6 to FIG. 9) indicates a user frame transmitted from the one switching device 9b to the other switching device 9a. Different from the OAM frame, the user frame may be a frame generated in a terminal device used by a user.

The individual switching devices 9a and 9b include a plurality of transmission and reception units 91a to 91e respectively including ports A to E, and switching units 90. The ports A to E may be interface units used for transmitting and receiving frames to and from the outside. The transmission and reception units 91a to 91e transmit and receive frames through the ports A to E, and one of the transmission and reception units 91a to 91e inputs and outputs frames from and to the other of the transmission and reception units 91a to 91e through the switching unit 90. The ports B and C may be integrated by the link aggregation LA.

Based on identification information assigned to a frame, the switching unit 90 transfers the frame between the ports A to E of the plural transmission and reception units 91a to 91e. The plural transmission and reception units 91a to 91e and the switching units 90 may be included in, for example, individual circuit boards housed in the chassis of a device.

In the switching device 9b on the transmitting side, the user frame is received through the port E of the transmission and reception unit 91e, transferred to the transmission and reception unit 91d by the switching unit 90, and transmitted through the port D of the transmission and reception unit 91d. In the switching device 9a on the receiving side, the user frame is received through the port A of the transmission and reception unit 91a, transferred to the transmission and reception unit 91b by the switching unit 90, and transmitted through the port B of the transmission and reception unit 91b. Since the port B is integrated with the port C of the transmission and reception unit 91c, the user frame may be transmitted from the port C. When the destination of the user frame is a node located ahead of the port B or C integrated by the link aggregation LA, the port B or C to which the user frame is to be transmitted is determined in the transmission and reception unit 91a serving as a reception source.

The OAM frame is generated in the MEP of the switching device 9b on the transmitting side, transferred to the transmission and reception unit 91d by the switching unit 90, and transmitted through the port D of the transmission and reception unit 91d. In the switching device 9a on the receiving side, the user frame is received through the port A of the transmission and reception unit 91a, transferred to the MEP of the transmission and reception unit 91b by the switching unit 90, and discarded after processing based on the control information of the OAM frame has been performed.

In FIG. 5, the ports B and C integrated by the link aggregation LA may be linked down. The link-down means that a communication-capable connection state with another device coupled through the ports A to E is lost. The link-down may be detected, for example, when a cable linked to a connection destination has been pulled or the transmission and reception units 91a to 91e have failed to operate properly.

Figure 6:
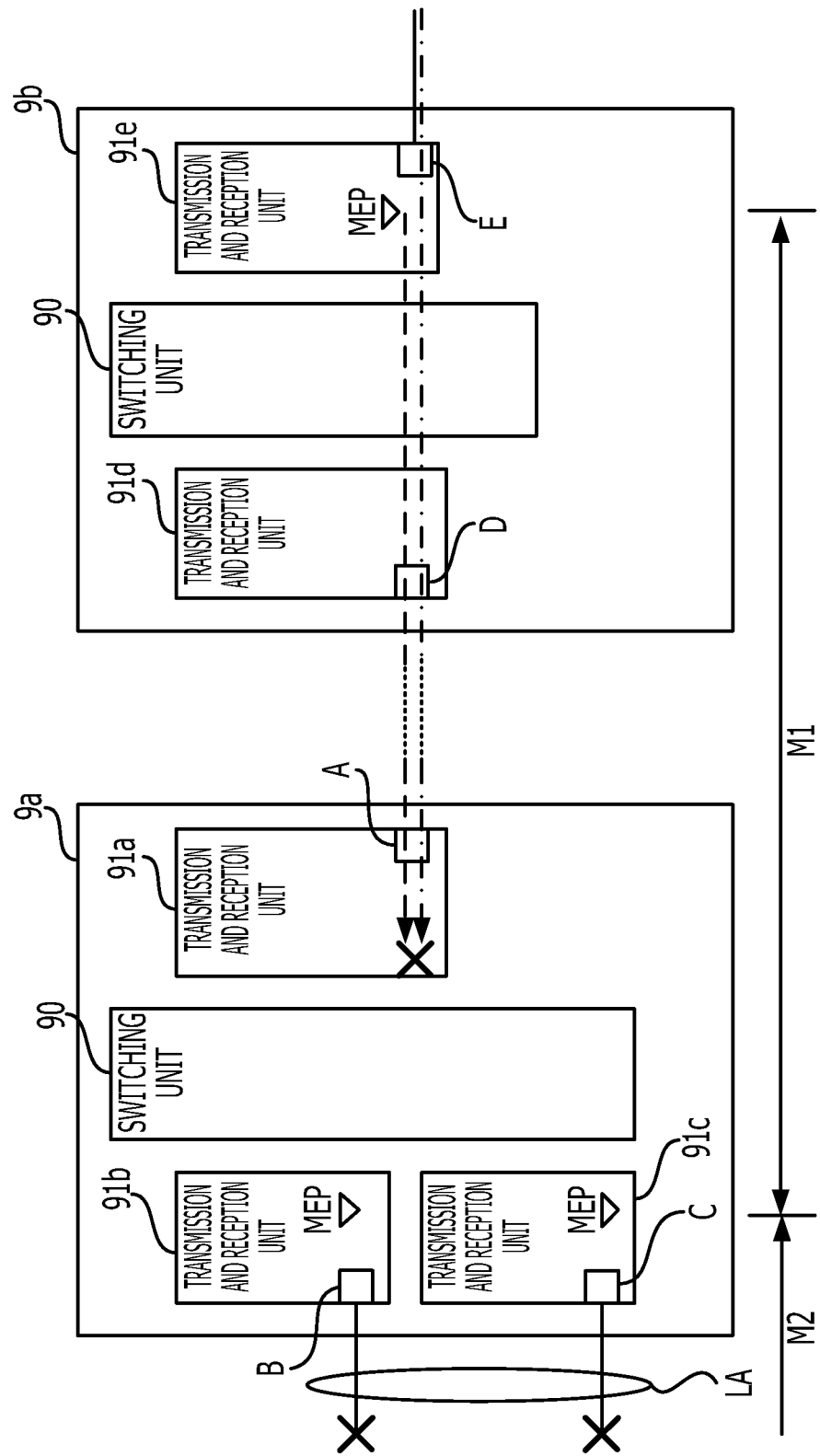
FIG. 6 illustrates an exemplary transmission path at a linkdown.

FIG. 6 illustrates an exemplary transmission path at a link-down. For example, FIG. 6 may illustrate the transmission paths of a user frame and an OAM frame when the link-down has occurred in FIG. 5. The link-down may occur in both of the ports B and C integrated by the link aggregation LA (refer to x marks).

Since the ports B and C have been linked down, the transmission and reception unit 91a may deem that the received user frame and OAM frame have no transfer destination, and discard the user frame and OAM frame (refer to an x mark). Owing to the link-down, the user frame may not be transmitted to another device liked to the ports B and C. In addition, the MEP of the transmission and reception unit 91b or 91c may be invalidated.

When the OAM frame has been discarded, an error may occur in, for example, the tests illustrated in FIG. 2 to FIG. 4. For example, in the connectivity test in FIG. 2, the OAM frame becomes unreceived, and a failure may be detected. In the tests illustrated in FIG. 2 and FIG. 3, since the response frame becomes unreceived, a failure may be detected. In other than FIG. 2 to FIG. 4, since the transmission of the control information is reduced owing to discarding of the OAM frame, the inhibition of normal monitoring or control within a monitoring interval M1 in which MEPs are set may increase.

A failure of link-down may be detected outside the monitoring interval M1 between the MEPs. The link-down is detected in a transmission interval M2 of a frame between the transmission and reception units 91b and 91c and a connection destination device. Since the switching devices 9a and 9b perform failure detection for the interval M2 in preference to the interval M1, from among the two different monitoring target intervals M1 and M2, normal monitoring or control by the OAM frame may be reduced.

Figure 7:
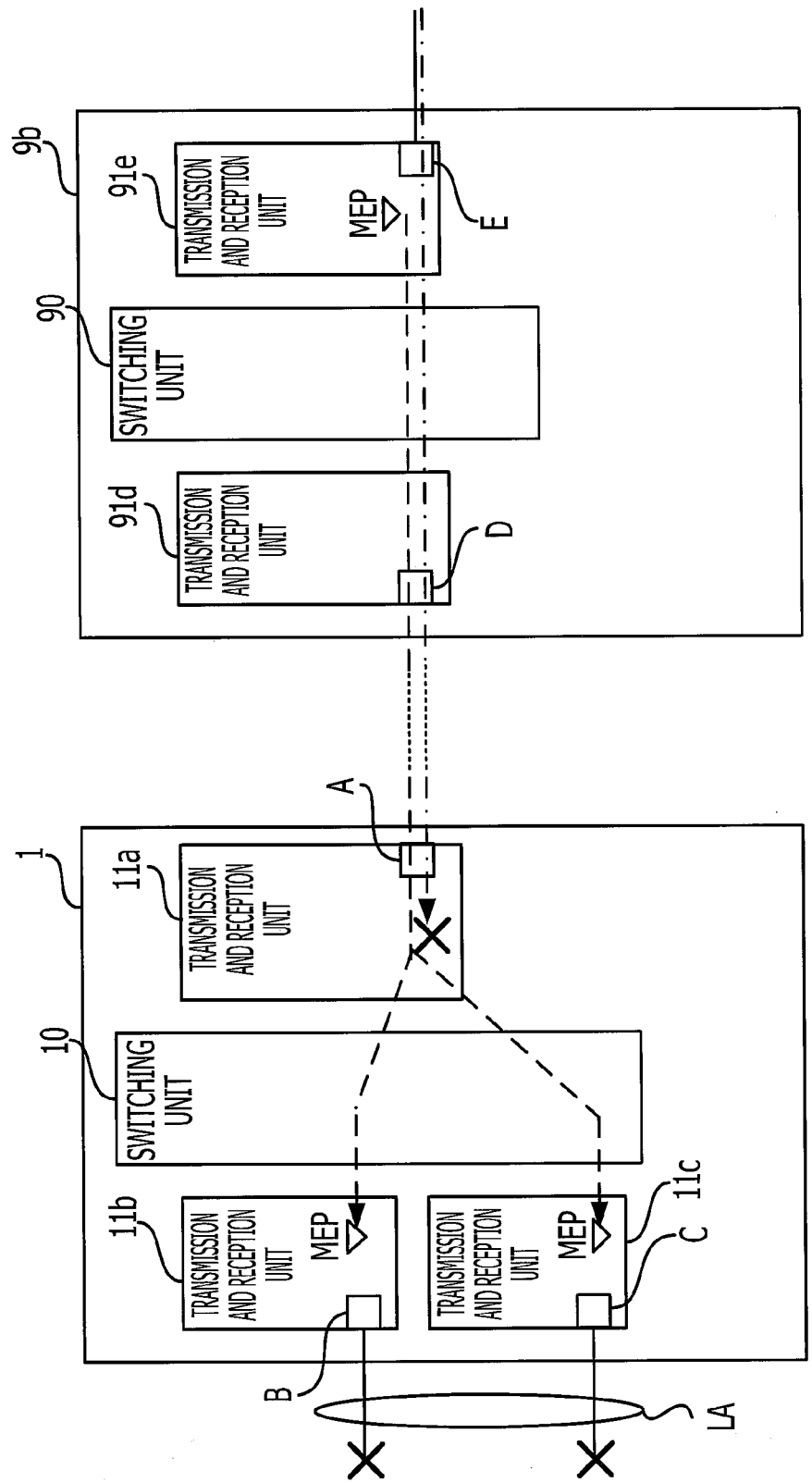
FIG. 7 illustrates an exemplary transmission path of a frame.

FIG. 7 illustrates an exemplary transmission path of a frame. In FIG. 7, the transmission paths of a user frame and an OAM frame between switching devices are illustrated. In FIG. 7, a switching device 1 on a receiving side is provided. The switching device 1 includes transmission and reception units 11a to 11c and a switching unit 10, and the ports B and C of the transmission and reception units 11b and 11c are integrated.

The transmission and reception unit 11a duplicates OAM frames received through a port A and transfers the received OAM frames to individual MEPs of the transmission and reception units 11b and 11c through the switching unit. For example, the OAM frames are distributed to transmission and reception units 11b and 11c with multicast within the device 1. The switching device 1 performs control in accordance with the control information of an OAM frame received by the MEP of one of the transmission and reception units 11b and 11c.

In the switching device 1, for example, when one of the transmission and reception units 11b and 11c receives no OAM frame owing to a failure, the control may be performed based on an OAM frame received by the other of the transmission and reception units 11b and 11c. Therefore, between MEPs, normal monitoring or control based on the OAM frame may be performed. While the two ports B and C are integrated by the link aggregation LA, the number of integrated ports may be arbitrary. In the switching device 1, the received user frame may be discarded by the transmission and reception unit 11a in substantially the same way as the switching device 9a (refer to a x mark).

When the MEPs of the transmission and reception units 11b and 11c have received OAM frames, for example, at the time of the loopback test illustrated in FIG. 3 or at the time of the link trace illustrated in FIG. 4, a plurality of response frames may be generated based on individual responses. When the switching device 9b has received a plurality of response frames, redundancy occurs in the control information. Therefore, normal monitoring or control may be reduced.

Figure 8:
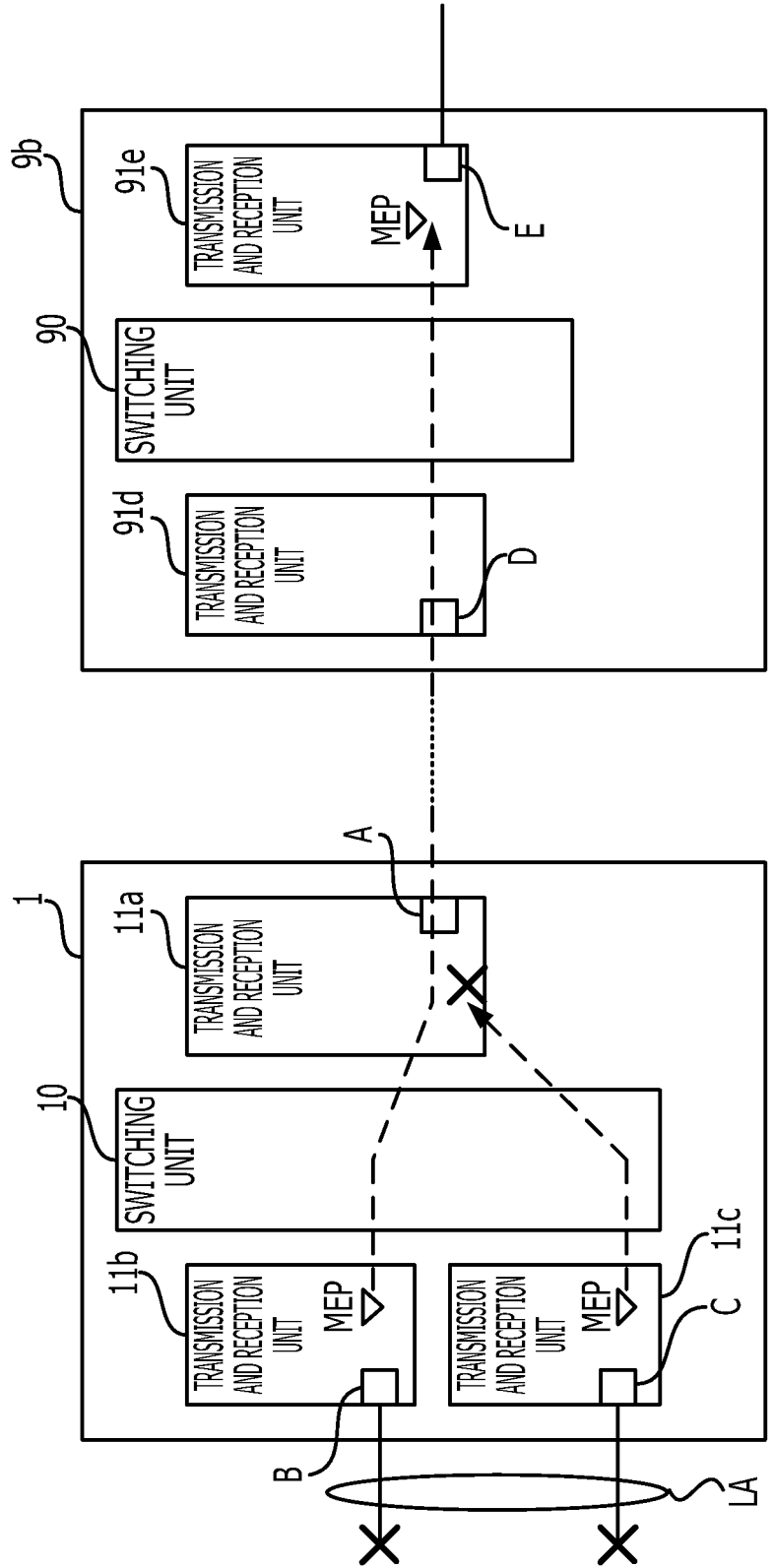
FIG. 8 illustrates an exemplary transmission path of a frame.

FIG. 8 illustrates an exemplary transmission path of a frame. In FIG. 8, the transmission path of a response frame in the transmission path illustrated in FIG. 7 may be illustrated. Individual MEPs of the transmission and reception units 11b and 11c transfer response frames to the transmission and reception unit 11a through the switching unit 10. While having received two response frames, the transmission and reception unit 11a discards one OAM frame because control information is redundant (refer to a x mark). The transmission and reception unit 11a transmits the other response frame to the switching device 9b through the port A. Therefore, since the switching device 9b receives one response frame, normal monitoring or control may be performed. While, in FIG. 8, two response frames are generated, the transmission and reception unit 11a may transmit one OAM frame and discard the other OAM frame without depending on the number of redundant OAM frames.

Figure 9:
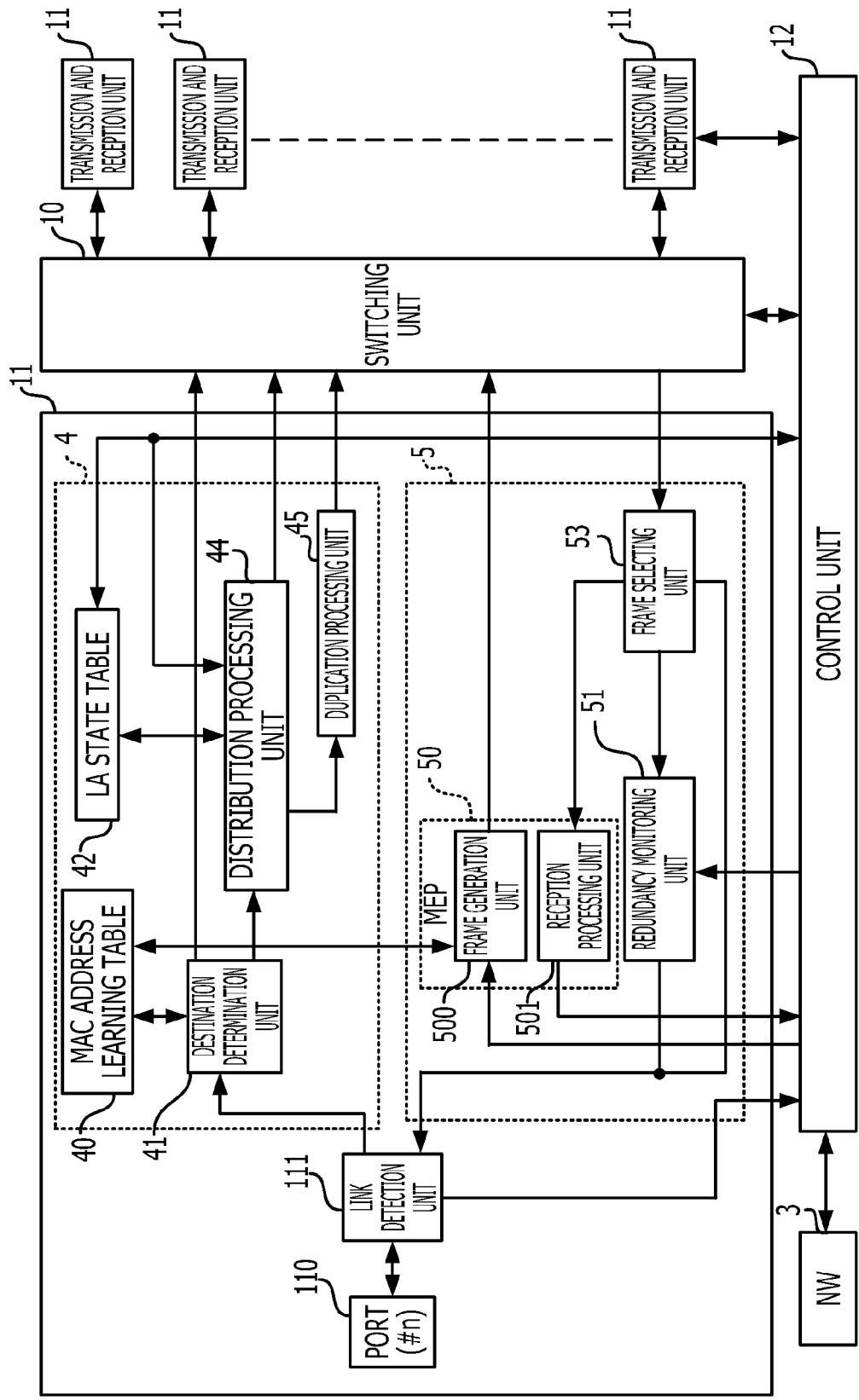
FIG. 9 illustrates an exemplary switching device.

FIG. 9 illustrates an exemplary switching device. The switching device 1 includes a plurality of transmission and reception units 11, the switching unit 10, and a control unit 12. While, in FIG. 9, a configuration having one transmission and reception unit 11 is illustrated, the other transmission and reception units 11 may also have substantially the same configuration as or a configuration similar to the transmission and reception unit illustrated in FIG. 9.

The control unit 12 includes an arithmetic processing circuit such as a Central Processing Unit (CPU) and a storage mechanism such as a memory storing therein a program or data, and performs communication with the management device 30 through the management network. The communication may be executed based on, for example, a Simple Network Management Protocol (SNMP).

The control unit 12 performs the setting of an MEP, control, various kinds of tests, or the like in response to a control signal of the management device 30, and notifies the management device 30 of a failure detected by an MEP. The control unit 12 may also function based on software, and may also function based on hardware such as an application specific integrated circuit.

Each of the plural transmission and reception units 11 includes a port 110 used for transmitting and receiving frames to and from another device, a link detection unit 111, a reception frame processing unit 4, and a transmission frame processing unit 5. The port 110 may be provided with respect to each transmission and reception unit 11, and a port number used for identifying each port 110 is assigned thereto in such a way as, for example, "#n" (n=1, 2, 3 . . . N).

While, in FIG. 9, the transmission and reception unit 11 includes one port 110, a plurality of ports 110 may be included. Link detection units 111, reception frame processing units 4, and transmission frame processing units 5 may be provided whose numbers correspond to the number of the ports 110. The link detection unit 111, the reception frame processing unit 4, and the transmission frame processing unit 5 may also be provided in another transmission and reception unit 11. For example, a plurality of the reception frame processing units 4 and a plurality of the transmission frame processing units 5 may be provided.

The link detection unit 111 detects the link state of the port 110 and notifies the control unit 12 of the link state. For example, the link detection unit 111 gives notice of the occurrence of a failure of link-down and restoration, for example, link-up. The link detection unit 111 may process, for example, communication of an Ethernet (registered trademark).

The reception frame processing unit 4 processes a frame received through the port 110. The reception frame processing unit 4 includes a MAC address learning table 40, a destination determination unit 41, an LA state table 42, a distribution processing unit 44, and a duplication processing unit 45.

Based on the destination of a received frame, the destination determination unit 41 determines the port 110 serving as a transfer destination.

FIG. 10 illustrates an exemplary OAM frame. The OAM frame includes a header, OAM data, and a Frame Check Sequence (FCS). The FCS may be data used for error correction. The header and FCS of a user frame may have substantially the same configuration as or a configuration similar to the header and FCS of the OAM frame.

The header includes a DA (Destination Address), an SA (Source Address), and a Type. The SA indicates the MAC address (MAC: Media Access Control) of a transmission source, and the DA indicates the MAC address of a destination. The Type indicates the type of a frame, for example, the value of the identification code of an OAM frame.

The OAM data includes an OAM frame type and other control information. FIG. 11 illustrates an exemplary OAM frame type. As illustrated in FIG. 11, the OAM frame type indicates the kind of the OAM frame, and includes a corresponding identification code. For example, a CCM may be used for the connectivity test illustrated in FIG. 2. An LBM and an LBR may be used for the loopback test illustrated in FIG. 3. An LTM and an LTR may be used for the link trace illustrated in FIG. 4.

An AIS gives notice of a failure detected on an uplink side of the device 1 in the network 2. When an MEP has received the AIS, that effect is notified to the control unit 12. In addition to the control frames illustrated in FIG. 11, the OAM frame type may include frames such as a TST (Test), an LCK (Lock signal), and APS (Automatic Protection Switching).

In the MAC address learning table 40, the DA serving as the destination of a frame and the port number (#1 to #n) of the port 110 serving as a transfer destination are registered with being associated with each other. With reference to the MAC address learning table 40, the destination determination unit 41 acquires a port number corresponding to the DA of a frame. When the DA of a received frame is not registered in the MAC address learning table 40, the destination determination unit 41 transfers the corresponding frame to all ports 110 other than the port 110 that has received. The SA of a frame received as a response to the frame and the port number of the receiving port 110 may be registered in the MAC address learning table 40 with being associated with each other.

When having received, through the port 110, a frame whose destination (DA) is a port belonging to a group integrating a plurality of physical communication lines, for example, the port 110 to which link aggregation is applied, the destination determination unit 41 outputs the corresponding frame to the distribution processing unit 44. This port may be expressed as an integration port hereinafter.

Based on the port number acquired from the MAC address learning table 40, the destination determination unit 41 performs determination processing relating to the destination of a frame. When having received a frame whose destination (DA) is another port 110 that is not the integration port, the destination determination unit 41 assigns a port number to the frame and outputs the frame to the switching unit 10.

The switching unit 10 transfers a frame received through one of the plural ports 110 to another port 110 selected based on the port number serving as the identification information assigned to the frame. The port number may be deleted before being transmitted from the port 110 serving as a transfer destination. The switching unit 10 illustrated in FIG. 9 may be provided independently from the plural transmission and reception units 11, and may also be provided with being attached to each transmission and reception unit 11.

With reference to the LA state table 42, the distribution processing unit 44 distributes frames to individual integration ports 110. FIG. 12 illustrates an exemplary LA state table. In the LA state table 42, a group number (refer to the column of "group") identifying the group of link aggregation, the port number (refer to the column of "port") of every integration port 110 belonging to each group, and the link state (refer to the column of "link state") of each integration port 110 are registered with being associated with one another.

Each item of the LA state table 42 is registered by the control unit 12. Based on the detection result of the link detection unit 111, when a link state is "normal", it is indicated that the integration port 110 is not linked down, and when a link state is "abnormal", it is indicated that the integration port 110 is linked down.

The distribution processing unit 44 processes an OAM frame in accordance with distribution setting information notified by the control unit 12. The distribution setting information indicates the presence or absence of the setting of the MEP (refer to a symbol 50) of each transmission and reception unit 11 in which the integration port 110 is provided, for example, the validity or invalidity thereof. The control unit 12 collectively sets the MEP 50 corresponding to each integration port 110, and also adds an MEP 50 along with the addition of a new integration port 110. The processing of a user frame may not depend on the presence or absence of the setting of the MEP 50.

When the setting of the MEP 50 is invalid, the distribution processing unit 44 distributes a frame to each port 110 where the link state of a group serving as the destination of the frame is "normal", in accordance with a predetermined algorithm. The destination determination unit 41 notifies the distribution processing unit 44 of a group number.

The distribution processing unit 44 assigns, to a frame, the port number of the port 110 determined by an algorithm, and outputs the frame to the switching unit 10. When the link states of all the ports 110 within the group are "abnormal", since there is no valid port 110, the distribution processing unit 44 discards the frame. The discard processing may be common to a user frame and an OAM frame.

When the setting of the MEP 50 is valid, the distribution processing unit 44 outputs an OAM frame to the duplication processing unit 45 along with the port number of each integration port 110 belonging to the group. The distribution processing unit 44 identifies the OAM frame based on the "Type" illustrated in FIG. 10.

The duplication processing unit 45 duplicates an OAM frame received through the port 110, individually assigns port numbers, which indicate individual integration ports 110 belonging to the group, to a plurality of duplicated frames obtained by the duplication, and outputs the plural duplicated frames to the switching unit 10. Since the duplication and output processing is performed independently of a link state within the LA state table 42, an OAM frame (duplicated frame) may also be transferred to a port 110 in which linkdown has occurred. The processing may not be performed on a user frame.

The processing performed in the duplication processing unit 45 may be substantially the same processing as or processing similar to the processing illustrated in FIG. 7. For example, the duplication processing unit 45, for example, the symbol 11*a* in FIG. 8, duplicates a received OAM frame, and individually transfers the duplicated OAM frame to the MEP of each of integration ports, for example, the symbols 11*b* and 11*c* in FIG. 8. The transferred OAM frame, for example, the duplicated frame, is received by the MEP 50 in the transmission frame processing unit 5 within the transmission and reception unit 11 serving as a transfer destination.

The transmission frame processing unit 5 includes the MEP 50, a redundancy monitoring unit 51, and a frame selecting unit 53. The MEP 50 includes a frame generation unit 500 and a reception processing unit 501.

The frame selecting unit 53 selects the output destination of a frame in accordance with the kind of a frame transferred from the switching unit 10 and a destination. The kind of a frame and the destination may correspond to the "Type" and "DA" illustrated in FIG. 10. The frame selecting unit 53 outputs, to the reception processing unit 501, an OAM frame whose destination is the MEP 50, and outputs the other OAM frames to the redundancy monitoring unit 51. The frame selecting unit 53 transmits a user frame through the port 110.

The reception processing unit 501 receives the OAM frame whose destination is the MEP 50. When the port 110 is an integration port, the reception processing unit 501 receives a plurality of duplicated frames output from the duplication processing unit 45. The processing may correspond to the processing performed in the MEPs of the transmission and reception units 11*b* and 11*c* illustrated in FIG. 7. A MAC address is individually assigned to the MEP 50, and when the DA coincides with the corresponding MAC address, the frame selecting unit 53 outputs the OAM frame to the reception processing unit 501.

The reception processing unit 501 may perform predetermined processing based on control information included in the OAM frame. The OAM frame may be a frame illustrated in FIG. 11.

When the OAM frame is a CCM, the reception processing unit 501 notifies the control unit 12 of a result of a connectivity test. When the OAM frame is an LBR, the reception processing unit 501 notifies the control unit 12 of a result of a loopback test. When the OAM frame is an LTR, the reception processing unit 501 notifies the control unit 12 of a result of a link trace. When the OAM frame is an AIS, the reception processing unit 501 notifies the control unit 12 of the detection of the AIS. When the OAM frame is an LBM or an LTM, the reception processing unit 501 notifies the control unit 12 of the corresponding control information. After having performed the above-mentioned processing, the reception processing unit 501 discards the OAM frame.

In accordance with control of the control unit 12, the frame generation unit 500 generates an OAM frame. When the reception processing unit 501 has received a duplicated frame such as an LBM or a L™, the frame generation unit 500 generates a response frame corresponding to the control information of the duplicated frame. For example, when the reception processing unit 501 has received the LBM, the frame generation unit 500 generates an LBR as the response frame. When the reception processing unit 501 has received the LTM, the frame generation unit 500 generates an LTR.

The OAM frame generated by the frame generation unit 500 is given the port number of a transfer destination acquired from the MAC address learning table 40 and the port number of a transfer source corresponding to the corresponding MEP 50 and output to the switching unit 10. The port number of a transfer destination and the port number of a transfer source may be deleted before being transmitted from the port 100.

The redundancy monitoring unit 51 monitors the presence or absence of the redundancy of an OAM frame (duplicated frame) transmitted to another device through the port 110, and when a redundant OAM frame has been detected, the redundancy monitoring unit 51 discards the OAM frame. The above-mentioned processing may correspond to the processing performed in the transmission and reception unit 11*a* illustrated in FIG. 8.

Figure 13:
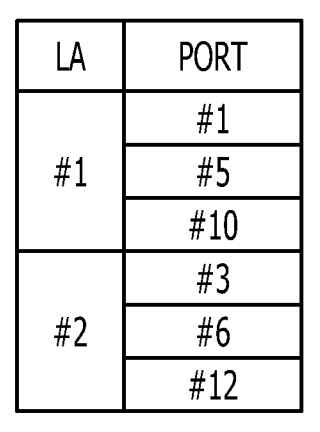
Figure 14:
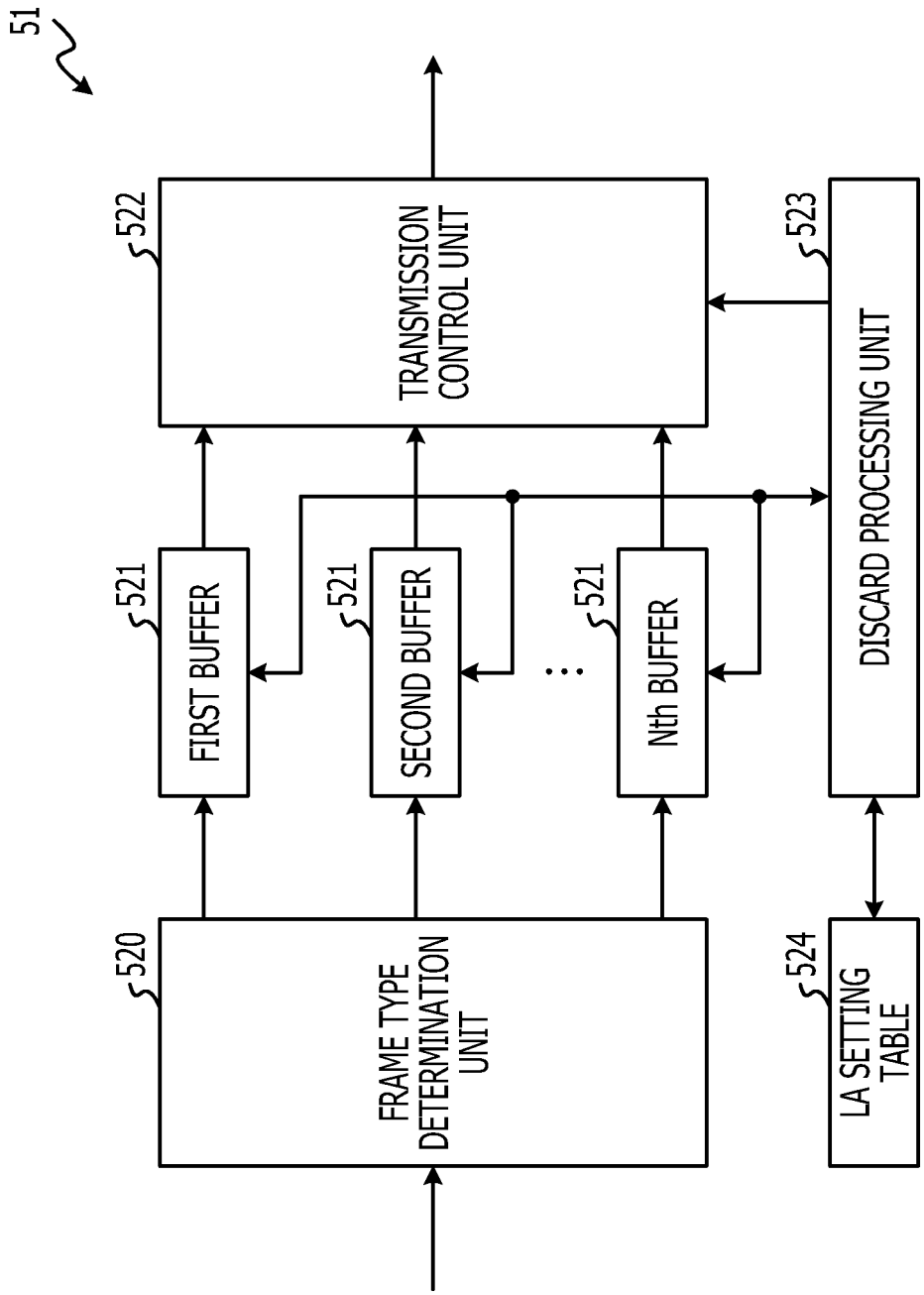
FIG. 14 illustrates an exemplary redundancy monitoring unit.

FIG. 13 illustrates an exemplary LA setting table. FIG. 14 illustrates an exemplary redundancy monitoring unit. The redundancy monitoring unit 51 includes a frame type determination unit 520, first to Nth buffers 521, a transmission control unit 522, a discard processing unit 523, and an LA setting table 524. In the LA setting table 524, as illustrated in FIG. 13, the port number of an integration port belonging to each group of link aggregation is registered by the control unit 12.

The first to Nth buffers 521 are provided with respect to individual kinds of the OAM frames illustrated in FIG. 11, and store therein corresponding OAM frames. For example, an LBR is stored in the first buffer 521, and an LTR is stored in the second buffer 521.

The frame type determination unit 520 determines the kind of an OAM frame based on the OAM frame types illustrated in FIG. 10. The frame type determination unit 520 outputs OAM frames to the corresponding first to Nth buffers 521. Based on control from the discard processing unit 523, the transmission control unit 522 reads OAM frames stored in the first to Nth buffers 521 and outputs the OAM frames to the port 110.

The discard processing unit 523 discards a redundant OAM frame from among the OAM frames stored in the first to Nth buffers 521. The redundancy monitoring unit 51 refers to the LA setting table 524, and when the port number of a transfer source, assigned to an OAM frame, indicates one of the integration ports 110, the redundancy monitoring unit 51 detects the redundancy of the OAM frame. When the port number of a transfer source indicates another port 110 that is not an integration port, the redundancy monitoring unit 51 controls the transmission control unit 522 so as to transmit the OAM frame through the port 110.

In the former case, the discard processing unit 523 discards redundant OAM frames stored in the first to Nth buffers 521 within a given period of time after OAM frames have been stored in the first to Nth buffers 521. For example, when no redundant OAM frame is detected, the discard processing unit 523 controls the transmission control unit 522 so as to hold OAM frames within the first to Nth buffers 521, duplicate the OEM frames and transmit the duplicated OAM frames through the port 110. The discard processing unit 523 discards the OAM frames held within the first to Nth buffers 521 after a given period of time has elapsed. The above-mentioned processing may be performed with respect to each group of integration ports and each buffer 521.

The given period of time is set by the control unit 12 with respect to the discard processing unit 523, and may be, for example, 10 (ms). During 10 (ms) after having held OAM frames within the first to Nth buffers 521, the discard processing unit 523 discards another redundant OAM frame every time receiving the redundant OAM frame. When OAM frames are a plurality of response frames generated by the frame generation unit 500 of another integration port 110, the influence of a transmission delay of a frame within the device 1 may be removed and effective discard processing may be performed, by adjusting the given period of time.

The above-mentioned processing may correspond to the processing illustrated in FIG. 8. The frame generation units 500 of each integration port 110, for example, the symbols 11b and 11c illustrated in FIG. 8, individually generate response frames with respect to duplicated frames received from the duplication processing unit 45 in another port 110. Therefore, a plurality of response frames where control information is redundant are transferred to a port 110 serving as a destination, for example, the symbol A illustrated in FIG. 8. The discard processing unit 523, for example, the symbol 11a illustrated in FIG. 8, transmits one response frame from the corresponding port 110 and discards the other response frames, from among the plural response frames. Therefore, normal monitoring or control between the MEPs 50 is executed.

Figure 15:
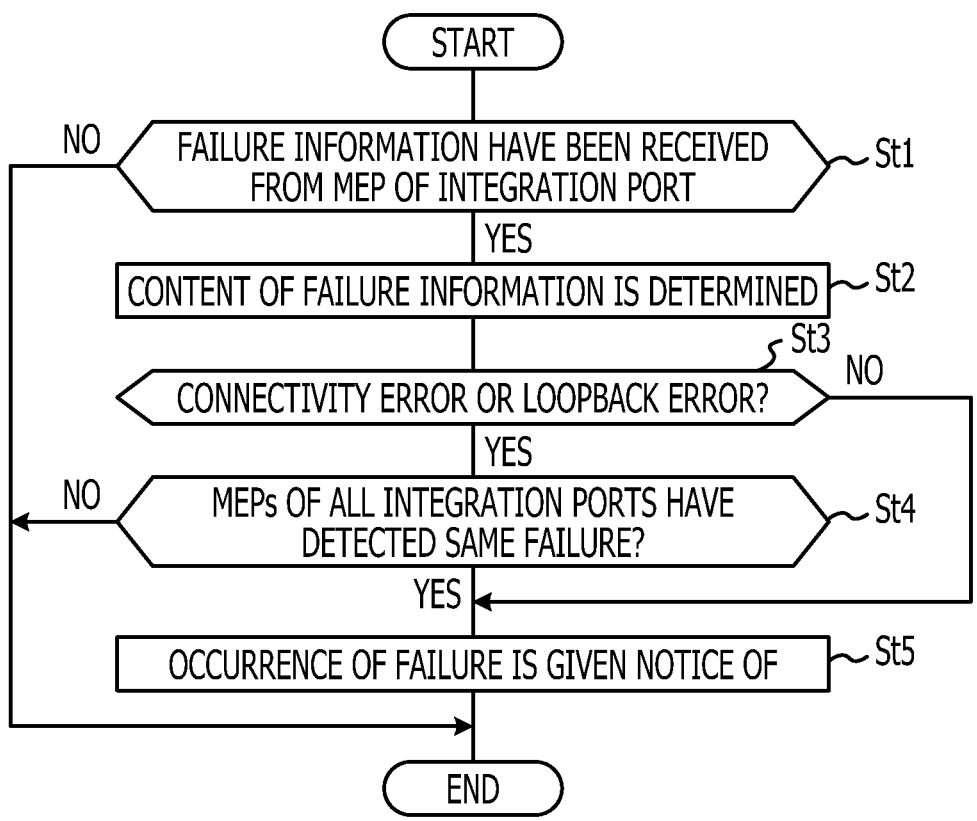
FIG. 15 illustrates an exemplary processing of a control unit.

The monitoring or control between the MEPs 50 is executed by the control unit 12 based on an instruction of the management device 30. FIG. 15 illustrates an exemplary processing of a control unit. In FIG. 15, processing performed by the control unit is illustrated that relates to failure monitoring performed when an OAM frame is duplicated and transferred to each integration port 110.

When having received failure information from the MEP 50 corresponding to the integration port 110 (operation St1), the control unit 12 determines the content of the failure information (operation St2). When, as a result of the determination, the failure information gives notice of, for example, an error of the connectivity test illustrated in FIG. 2 or an error of the loopback test illustrated in FIG. 3 (operation St3: YES), the control unit 12 determines whether or not substantially the same failure has been detected in the MEPs 50 of all integration ports 110 (operation St4).

When, as a result of the determination, substantially the same failure has been detected in the MEPs 50 of all the integration ports 110 (operation St4: YES), the control unit 12 notifies the management device 30 of the occurrence of a failure (operation St5). When, in at least one MEP 50, a failure has not been detected (operation St4: NO), the processing is terminated without giving notice of the occurrence of a failure. When not having received failure information (operation St1: NO), the control unit 12 terminates the processing.

When, in the operation St3, the detected failure does not give notice of an error of the connectivity test or an error of the loopback test (operation St3: NO), the control unit 12 notifies the management device 30 of the occurrence of a failure (operation St5). For example, when the AIS illustrated in FIG. 11 has been detected in an MEP 50, the control unit 12 notifies the management device 30 of the occurrence of a failure. When the AIS has been detected in at least one MEP 50, the control unit 12 notifies the management device 30 of the occurrence of the AIS.

In an MEP 50, based on control information included in a duplicated frame received by the reception processing unit 501, for example, an OAM frame, a failure is detected. The control unit 12 performs control in accordance with control information included in a duplicated frame received by one of a plurality of the reception processing units 501, from among a plurality of duplicated frames. This control may be executed in failure monitoring, link trace, or the like. The control unit 12 notifies the management device 30 of a result of link trace, detected in one MEP 50.

The switching device 1 duplicates a frame received through the port 110, and transfers a plurality of duplicated frames, which are duplicated, to the individual ports 110 belonging to a group of link aggregation. The control unit 12 performs control in accordance with control information included in one of duplicated frames received by the MEP 50 of each port 110, for example, the reception processing unit 501. When one of the transmission and reception units 11 fails to operate properly and link-down is detected, another normal transmission and reception unit 11 receives a duplicated frame. Therefore, the control unit 12 performs control based on the control information independently of the link state of the integration port 110. In the network 2, normal monitoring or control is performed, and it may become easy to monitor a failure.

The communication device may be a switching device, a router device including the function of Layer 2, or a transmission device such as a medium converter.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
   a plurality of ports configured to transmit and receive frames to and from another device;
   a switch configured to transfer the frames to another port based on identification information of the frames; and
   a central processing unit configured to perform first control on the communication device, wherein the central processing unit performs, as the first control, operations of:
      receiving the frames transferred from the switch;
      acquiring frames to be duplicated based on a validity of a setting as a management end point to a port which is included in the plurality of ports and belongs to a group integrating a plurality of physical communication lines of the plurality of ports;
      duplicating the frames to be duplicated,
      assigning the identification information indicating a corresponding port to a plurality of duplicated frames;
      outputtinq the plurality of duplicated frames to the switch; and
      performing second control in accordance with control information included in one duplicated frame of the plurality of duplicated frames.

2. The communication device according to claim 1, wherein at least two ports of the plurality of ports belong to the group.

3. The communication device according to claim 1, further comprising:
   generating response frames corresponding to the control information of the plurality of duplicated frames based on the first control; and
   discarding a redundant frame from among the plurality of response frames.

4. The communication device according to claim 3, further comprising:
   storinq the plurality of response frames in a buffer,
   wherein a redundant response frame stored in the buffer is discarded within a certain time period after the response frames have been stored in the buffer.

5. The communication device according to claim 4, further comprising:
adjusting the certain time period.

6. The communication device according to claim 2, wherein
the port belonging to the integrating group is integrated using link aggregation.

7. A communication system comprising:
a plurality of ports configured to transmit and receive frames to and from a device;
a switch configured to transfer the frames to another port based on identification information of the frames; and
a central processing unit configured to perform first control on the communication device, wherein the central processing unit performs, as the first control, operations of:
receiving the frames transferred from the switch;
detecting a failure;
acquiring frames to be duplicated based on a validity of a setting as a management end point to a port which is included in the plurality of ports and belongs to a group integrating a plurality of physical communication lines of the plurality of ports;
duplicating the frames, to be duplicated;
assigning the identification information indicating a corresponding port to a plurality of duplicated frames;
outputting the plurality of duplicated frames to the switch; and
performing second control in accordance with control information included in one duplicated frame of the plurality of duplicated frames.

8. The communication system according to claim 7, wherein a link state of one of the plurality of ports is detected as the failure.

9. The communication system according to claim 8, wherein the at least two ports of the plurality of ports belong to the group.

10. A communication method comprising:
transferring frames to another port through a switching unit based on identification information of frames received through at least one port of a plurality of ports that transmit and receive the frames to and from another device;
acquiring frames to be duplicated based on a validity of a setting as a management end point to a port which is included in the plurality of ports and belongs to a group integrating a plurality of physical communication lines of the plurality of ports;
duplicating the frames to be duplicated, individually assigning the identification information indicating a corresponding port to a plurality of duplicated frames, and outputting the plurality of duplicated frames to the switch; and
performing control in accordance with control information included in one duplicated frame of the plurality of duplicated frames.

11. The communication device according to claim 1, wherein the frames are discarded based on link states of ports of the group.

12. The communication system according to claim 7, wherein the frames are discarded based on link states of ports of the group.

13. The communication method according to claim 10, further comprising, discarding the frames based on link states of ports of the group.

* * * * *

UNITED STATES PATENT AND TRADEMARK OFFICE
CERTIFICATE OF CORRECTION

PATENT NO. : 8,929,200 B2
APPLICATION NO. : 13/770084
DATED : January 6, 2015
INVENTOR(S) : Hirotaka Yamada Page 1 of 1

It is certified that error appears in the above-identified patent and that said Letters Patent is hereby corrected as shown below:

In the Claims

Column 12, line 47, In Claim 1, delete "outputtinq" and insert  -- outputting --, therefor.
Column 12, line 64, In Claim 4, delete "storinq" and insert -- storing --, therefor.
Column 13, line 23, In Claim 7, delete "frames," and insert -- frames --, therefor.

Signed and Sealed this
Fifth Day of May, 2015

Michelle K. Lee
*Director of the United States Patent and Trademark Office*